United States Patent
Lo et al.

(10) Patent No.: US 11,171,861 B2
(45) Date of Patent: Nov. 9, 2021

(54) FAST FAILOVER AND RECOVERY FOR OVERLAY NETWORKS

(71) Applicant: Arista Networks, Inc., Santa Clara, CA (US)

(72) Inventors: Alton Lo, Fremont, CA (US); Amit Dattatray Ranpise, San Jose, CA (US); Anda Wang, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 140 days.

(21) Appl. No.: 16/726,168

(22) Filed: Dec. 23, 2019

(65) Prior Publication Data

US 2021/0194792 A1 Jun. 24, 2021

(51) Int. Cl.
*H04L 12/707* (2013.01)
*H04L 12/741* (2013.01)
*H04L 29/12* (2006.01)
*H04L 12/715* (2013.01)

(52) U.S. Cl.
CPC .............. *H04L 45/22* (2013.01); *H04L 45/64* (2013.01); *H04L 45/745* (2013.01); *H04L 61/103* (2013.01)

(58) Field of Classification Search
CPC ..... H04L 45/22; H04L 45/745; H04L 61/103; H04L 45/64
See application file for complete search history.

(56) References Cited

U.S. PATENT DOCUMENTS

| 2003/0043853 | A1* | 3/2003 | Doyle | H04L 61/10 370/489 |
| 2008/0181241 | A1* | 7/2008 | Regan | H04L 45/586 370/401 |
| 2015/0331762 | A1* | 11/2015 | Wollbrand | G06F 11/2007 714/4.11 |
| 2016/0205020 | A1* | 7/2016 | Xu | H04L 12/4641 370/392 |
| 2018/0077047 | A1* | 3/2018 | Srinivasan | H04L 45/02 |
| 2019/0110214 | A1* | 4/2019 | Shen | H04L 45/50 |
| 2021/0014106 | A1* | 1/2021 | Haltore | H04L 41/0668 |

* cited by examiner

*Primary Examiner* — Walli Z Butt
(74) *Attorney, Agent, or Firm* — Fountainhead Law Group P.C.

(57) ABSTRACT

Systems and methods for generating a route advertisement including a sequence number associated with a network layer address. An illustrative method includes receiving a first route advertisement advertising a path to a primary device, the first route advertisement including a network layer address, a first link layer address, and a first sequence number associated with the network layer address; receiving a gratuitous address resolution message from a standby device, the gratuitous address resolution message including the network layer address and a second link layer address; generating a second route advertisement advertising a path to the standby device, the second route advertisement including the network layer address, the second link layer address, and a second sequence number associated with the network layer address, wherein the second sequence number is incremented by a predetermined increment value over the first sequence number; and transmitting the second route advertisement.

26 Claims, 9 Drawing Sheets

FAST FAILOVER AND RECOVERY FOR OVERLAY NETWORKS

BACKGROUND

The present disclosure relates to handling of address resolution messages in computer networks.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
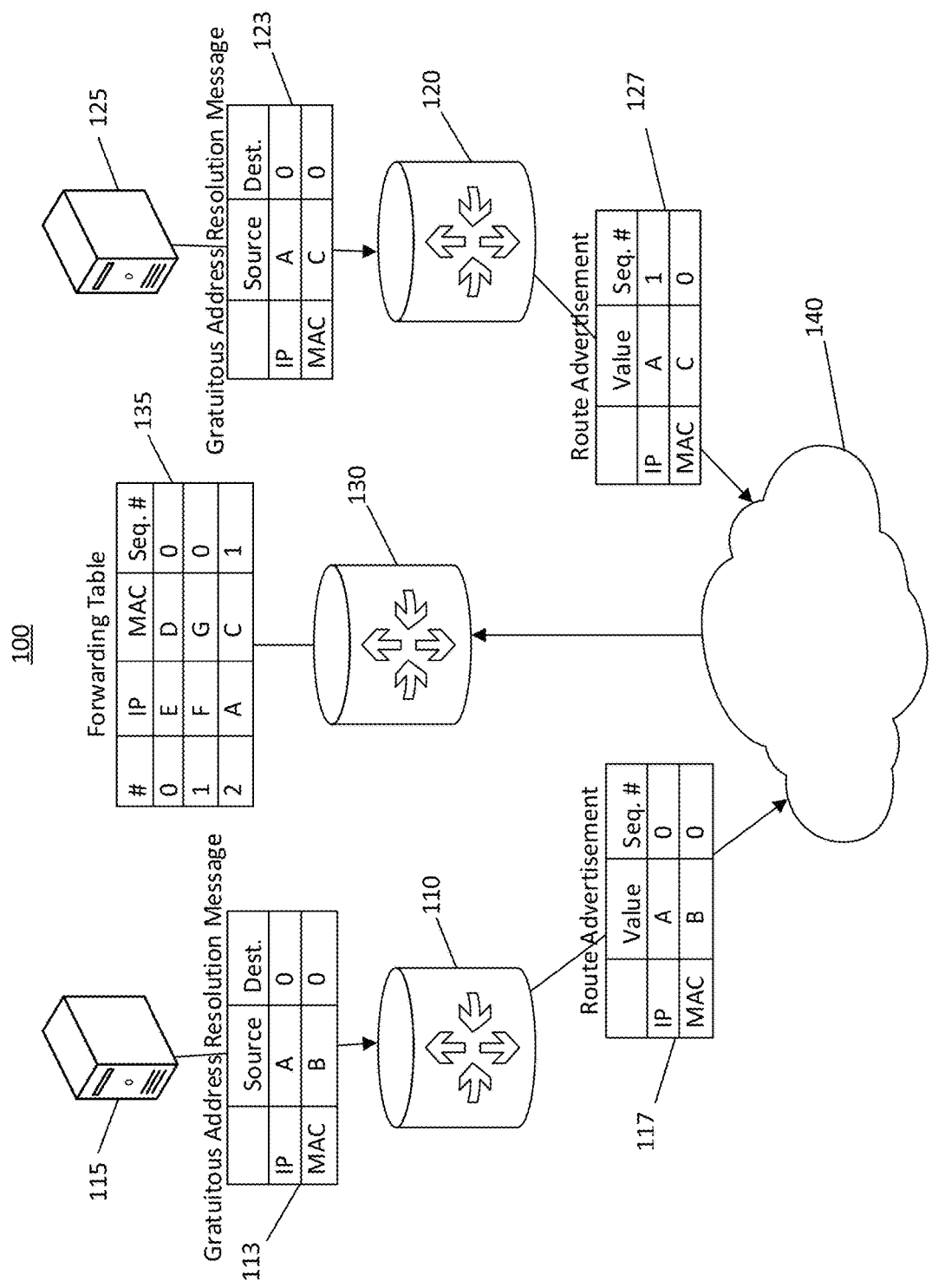
FIG. 1 shows an illustrative diagram of a system for distributing a route advertisement including a sequence number associated with a network layer address, in accordance with some embodiments of the disclosure.

In some computer networks, route advertisements are generated by and shared between routers (and route reflectors/route servers) to provide the various routers with paths to hosts connected to the routers. The route advertisements (e.g., ethernet virtual private network (EVPN) update messages and border gateway protocol (BGP) update messages) generally include, among other information, a network layer address (e.g., interne protocol (IP) address) and a link layer address (e.g., media access control (MAC) address) of the host (e.g., servers, virtual machines, etc.) for which the route advertisement advertises a path. Route advertisements further include a sequence number associated with the link layer address. The sequence number (sometimes referred to as a mobility value) indicates the order in which the associated link layer address has appeared in route advertisements. For example, the first time a particular link layer address is included in a route advertisement shared on the network, the associated sequence number is set to 0 (or another predetermined starting value). If the same link layer address is subsequently included in another route advertisement, the associated sequence number will increase by 1 (or another predetermined increment). For example, if the host having that link layer address is later connected to a different router, that router will generate a new route advertisement to advertise a path for that host. Since this will be the second time the link layer address of that host is included in a route advertisement, the sequence number included in the new route advertisement will be increased by 1.

Some network architectures provide for redundancy in critical devices and/or services. For example, servers hosting critical applications and/or providing critical services may be configured in a primary/standby pair with a shared network layer address (e.g., a shared virtual internet protocol (VIP) address). The primary server is configured to be active, while the standby server is configured as a backup that will take over the functionality as well as the VIP address if the primary server goes offline. To facilitate this take-over process, the primary server issues a gratuitous address resolution message (e.g., a gratuitous address resolution protocol (ARP) message or gratuitous neighbor discovery protocol (NDP) message) including its IP-to-MAC binding when it is first brought online on the network. In this case, the primary server's IP address is the shared VIP address. The gratuitous address resolution message is received by a router connected to the primary server. The router, in turn, generates a route advertisement including the IP-to-MAC binding of the primary server, and transmits the route advertisement to other routers on the network. Upon receiving the route advertisement, the other routers will (i) add the route to the primary server to their forwarding tables, and (ii) add the IP-to-MAC binding included in the route advertisement to their address resolution tables in order to route network traffic destined for the VIP to the primary server.

Once the primary server goes offline, the standby server comes online and takes over the shared VIP address. In order to notify the other devices on the network that the standby server has taken over the shared VIP address, it issues a gratuitous address resolution message. The gratuitous address resolution message includes the IP-to-MAC binding of the standby server. In this scenario, the standby server is taking over the IP address of the primary server, and thus its IP address is the VIP address shared by the primary server and the standby server. The standby server will, however, have a different MAC address than the primary server, and thus its IP-to-MAC binding is different from the IP-to-MAC binding of the primary server.

Upon receiving this gratuitous address resolution message, the router connected to the standby server generates a route advertisement including the IP-to-MAC binding of the standby server and transmits the route advertisement to the other routers in the network. This route advertisement will include a sequence number of 0 (or another initiation value) for the MAC address. This will be true the first time the standby server comes online, as well as any subsequent times the standby server comes online, because the standby server remains connected to the same router, and thus the location of the MAC address will not have changed even if the standby server goes offline and comes back online.

The sequence number for the MAC address does not, however, indicate that the VIP address (included in the IP-to-MAC binding of the standby server) has moved from the primary server. Thus, when the other routers receive this route advertisement, it may be the second route advertisement they receive that includes the VIP address—the other route advertisement having been previously provided for the primary server. Both of these route advertisements will include a sequence number of 0 for the MAC address. Thus, the sequence number for the MAC address cannot be used to determine which of the route advertisements include the correct/current IP-to-MAC binding for the VIP address. In some implementations, routers resolve such conflicts by storing, in their address resolution tables, the IP-to-MAC binding included in the most recently received route advertisement including a particular IP address. This may result in different routers having entries for a particular IP address with different IP-to-MAC bindings stored in their address resolution tables because different routers on the network will receive the route advertisements at different times, and potentially in different orders. Thus, in networks where a standby server is taking over a VIP address of a primary server, some routers in the network may still try to forward traffic to the primary server (which has gone offline) if they receive a route advertisement for the primary server after they received a route advertisement for the standby server. This results in network traffic loss, which will continue until the IP-to-MAC binding of the primary server expires, which will cause the router connected to the primary server to withdraw the route advertisement for the primary server.

Various systems and methods described herein address these problems by configuring routers to include, in route advertisements, a sequence number associated with an IP address. The sequence number for the IP address starts at 0 (or another predetermined starting value) for the first IP-to-MAC binding advertised on the network that includes the IP address. If the IP address is subsequently included in a different route advertisement with a different IP-to-MAC binding, the sequence number is incremented by 1 (or another predetermined increment). Thus, when a router receives a route advertisement, the router will update the entry in its address resolution table for the IP address with the IP-to-MAC binding only if the sequence number associated with the IP address is higher than the sequence number for the IP address included in a previously received route advertisement with an IP-to-MAC binding including that IP address. The sequence number may be a 32-bit sequence number and may be included in an extended community attribute (e.g., an EVPN extended community attribute and/or a BGP extended community attribute). The sequence number may be stored in a routing table in association with the IP-to-MAC binding, indicating the sequence of the IP-to-MAC binding. In some embodiments, the sequence number may include a flags octet, of which a low-order bit (or right-most bit) may be a proxy flag. Routers receiving a route advertisement with the sequence number may extract the low-order bit of the flags octet and determine, based on the status of the low-order bit, whether the routers may operate as address resolution proxies for the IP address.

In some embodiments, if a route advertisement is withdrawn by a router, which causes the other routers to remove the IP-to-MAC binding from their address resolution tables, a subsequently generated route advertisement including that IP address will again start with a sequence number of 0 (or another predetermined starting value).

FIG. 1 shows an illustrative diagram of a system for distributing a route advertisement including a sequence number associated with a network layer address. In particular, FIG. 1 shows a network 100 in which a primary host 115 and a standby host 125 share a VIP address. Primary host 115 may be any server, hypervisor, and/or other computing device which may be configured with a VIP address. In an example scenario described herein, primary host 115 provides important services and/or functionality to other devices on network 100. Standby host 125 serves as a backup to primary host 115 and is configured to provide the same services and/or functionality to the other devices on network 100. In a starting configuration, primary host 115 is online (or active) while standby host 125 is offline (or inactive).

Primary host 115 is connected to a network device 110, and standby host 125 is connected to a network device 120. Network devices 110 and 120 may be routers, switches, and/or any other devices configured to receive and forward network traffic between other devices on the network. When primary host 115 first comes online, primary host 115 sends a gratuitous address resolution message 113 to network device 110. Gratuitous address resolution message 113 includes a source network layer address (in this instance, the VIP address shared by primary host 115 and standby host 125), and a source link layer address (i.e., the MAC address of primary host 115). Gratuitous address resolution message 113 may further include a destination network layer address and a destination link layer address. In some embodiments, the destination network layer address and/or destination link layer address are omitted or invalid values.

Upon receiving gratuitous address resolution message 113 from primary host 115, network device 110 learns the IP-to-MAC binding (i.e., the network layer address and link layer address pair) of primary host 115. Network device 110 may store or update an entry for the IP-to-MAC binding of primary host 115 in a forwarding table (e.g., an ARP table and/or an NDP table) stored in storage 308 (described below with reference to FIG. 3A). Network device 110 further generates a route advertisement 117 to advertise a path to primary host 115 to network 100. Route advertisement 117 includes the network layer address and link layer address of primary host 115, as received in gratuitous address resolution message 113, along with separate sequence numbers associated with each of the network layer address and the link layer address (referred to hereinafter as an "IP sequence number," which is associated with the network layer address, and a "MAC sequence number," which is associated with the link layer address). Because this is the first time that VIP address is advertised on network 100, the IP sequence number is set to 0 (or another initiation value). Likewise, because primary host 115 is at its initial location on network 100 (it is the first time its link layer address is advertised), the MAC sequence number is set to 0 (or another initiation value). Network device 110 then transmits route advertisement 117 to other network devices on network 100 with which it maintains an EVPN session. In the example shown in FIG. 1, network device 110 transmits route advertisement 117 to network devices 120 and 130. Upon receiving route advertisement 117, the other network devices update their routing and forwarding tables and send network traffic destined for the VIP address (which is assigned to primary host 115) to network device 110.

When primary host 115 goes offline, standby host 125 is brought online. This may happen via either an automatic or manual procedure. Those skilled in the art will appreciate that various approaches may be used to determine whether a primary host has gone offline and/or whether a standby host should be brought online, and therefore the specifics of how this procedure is performed will not be further described here. When standby host 125 comes online, standby host 125 sends a gratuitous address resolution message 123 to network device 120. Gratuitous address resolution message 123 includes a source network layer address (in this instance, the VIP address shared by primary host 115 and standby host 125), and a source link layer address (i.e., the MAC address of standby host 125). Gratuitous address resolution message 123 may further include a destination network layer address and a destination link layer address. In some embodiments, the destination network layer address and/or destination link layer address are omitted or invalid values.

Upon receiving gratuitous address resolution message 123 from standby host 125, network device 120 "learns" the IP-to-MAC binding (i.e., the network layer address and link layer address pair) of standby host 125. Network device 120 may store or update an entry for the IP-to-MAC binding of standby host 125 in its forwarding table. Network device 120 further generates a route advertisement 127 to advertise a path to standby host 125 to network 100. Route advertisement 127 includes the network layer address and link layer address of standby host 125, as received in gratuitous address resolution message 123, along with an IP sequence number and a MAC sequence number. Because this is the second time the VIP address is advertised on network 100, the IP sequence number included in route advertisement 127 is set to 1. The MAC sequence number, however, is set to 0 (or another initiation value) since this is the first time the link layer address to standby host 125 is advertised on network 100. Network device 120 then transmits route advertisement 127 to other network devices on network 100 with which it maintains an EVPN session. In the example shown in FIG. 1, network device 120 transmits route advertisement 127 to network devices 110 and 130. Upon receiving route advertisement 127, the other network devices update their routing and forwarding tables and send network traffic destined for the VIP address (which is now assigned to standby host 125) to network device 120.

Network device 130, which is not directly connected to either primary host 115 or standby host 125, will receive both route advertisement 117 and route advertisement 127. Upon receiving each route advertisement, network device 130 will extract the IP sequence number a network layer address to determine whether to update an entry for that network layer address in its forwarding table 135. For example, network device 130 will only update an entry for a network layer address if the IP sequence number included in the route advertisement is higher than the IP sequence number associated with the IP-to-MAC binding that is stored in forwarding table 135. In some embodiments, even though route advertisement 117 was transmitted by network device 110 before route advertisement 127 was transmitted by network device 120, network device 130 may receive route advertisement 127 before receiving route advertisement 117. Even in such scenarios, network device 130 will store the latest IP-to-MAC binding in forwarding table 135 by comparing the IP sequence numbers of newly received route advertisements. While FIG. 1 shows only network device 130 having a forwarding table 135, those skilled in the art will appreciate that each network device in network 100, including network devices 110 and 120, will have a forwarding table and will maintain their respective forwarding tables using the same or similar process to that described above for network device 130.

Figure 2:
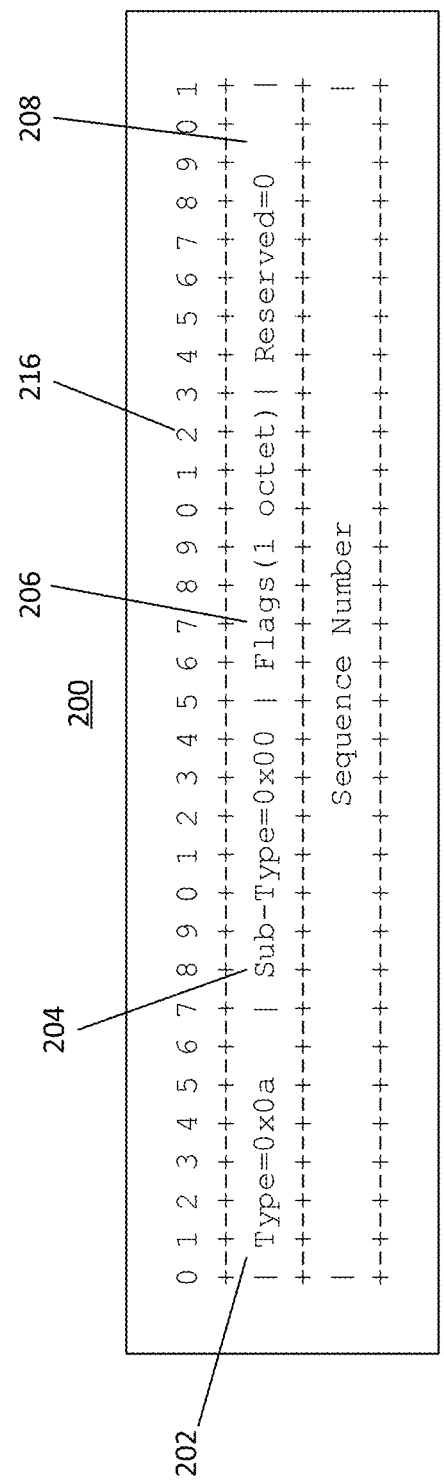
FIG. 2 shows an illustrative bit mapping of a sequence number associated with a network layer address, in accordance with some embodiments of the disclosure.

FIG. 2 shows an illustrative bit mapping for an IP sequence number, according to some embodiments of the present disclosure. In particular, FIG. 2 shows a bit map for a 32-bit IP sequence number 200. IP sequence number 200 may be a transitive extended community. As shown in FIG. 2, IP sequence number 200 includes a type field 202 with a value of 0x0a, a sub-type field 204 with a sub-type value of 0x00, a flags octet 206, and a reserved octet 208. In the embodiment shown in FIG. 2, the low-order bit (or rightmost bit) of flags octet 206 is designated as a proxy flag 216.

Figure 3A:
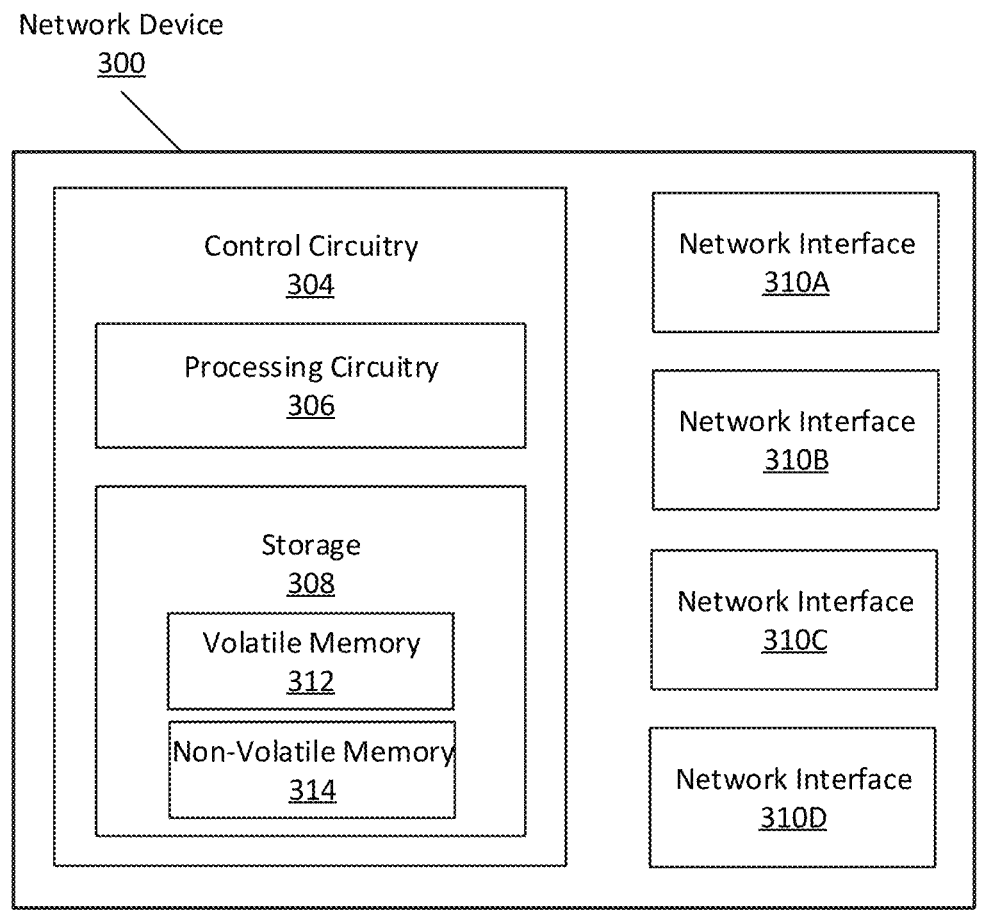
FIG. 3A shows a diagram of an illustrative network device of the system of FIG. 1, in accordance with some embodiments of the disclosure.

FIG. 3A shows a generalized embodiment of a network device 300. As depicted, network device 300 may be a router, a switch, and/or any other network device configured to receive network traffic from a first device and forward the network traffic to a second device, such as by performing an address lookup in a forwarding table. Those skilled in the art will recognize that network devices 110, 120, and 130 of FIG. 1 may be implemented as network device 300. Network device 300 may receive network traffic (e.g., gratuitous address resolution messages 113 and 123) via a network interface (e.g., network interface 310A), and provide the network traffic to control circuitry 304, which includes processing circuitry 306 and storage 308. While network device 300 is shown as including four network interfaces (e.g., network interfaces 310A, 310B, 310C, and 310D), this is merely illustrative, and those skilled in the art will appreciate that network device 300 may include any number of network interfaces, and that the network interfaces may be of any type of wired or wireless network interface, such as RJ45 ethernet ports, a coaxial ports, logical ports, wireless interfaces (e.g., 802.11x interfaces, BLUETOOTH interfaces, cellular interfaces, etc.

Control circuitry 304 may be based on any suitable processing circuitry, such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 304 executes instructions for extracting values from gratuitous address resolution messages, comparing sequence numbers, and generating route advertisements, as described further below with reference to FIGS. 4-7. Control circuitry 304 may further transmit route advertisements 117 and 127 to other devices connected to network device 300.

Storage 308 may include volatile random-access memory (RAM) 312, which does not retain its contents when power is turned off, and non-volatile RAM 314, which does retain its contents when power is turned off. In some embodiments, storage 308 may be an electronic storage device that is part of control circuitry 304. As referred to herein, the phrase "electronic storage device" or "storage device" should be understood to mean any device for storing electronic data, computer software, instructions, and/or firmware, such as random-access memory, content-addressable memory, hard drives, optical drives, solid state devices, quantum storage devices, or any other suitable fixed or removable storage devices, and/or any combination of the same. In some embodiments, forwarding table 135 is stored in storage 308. In other embodiments, forwarding table 135 may be stored on a separate device and a link to forwarding table 135 may be stored in storage 308. The circuitry described herein may execute instructions included in software running on one or more general purpose or specialized processors. Multiple circuits may be provided to handle simultaneous processing functions.

Figure 3B:
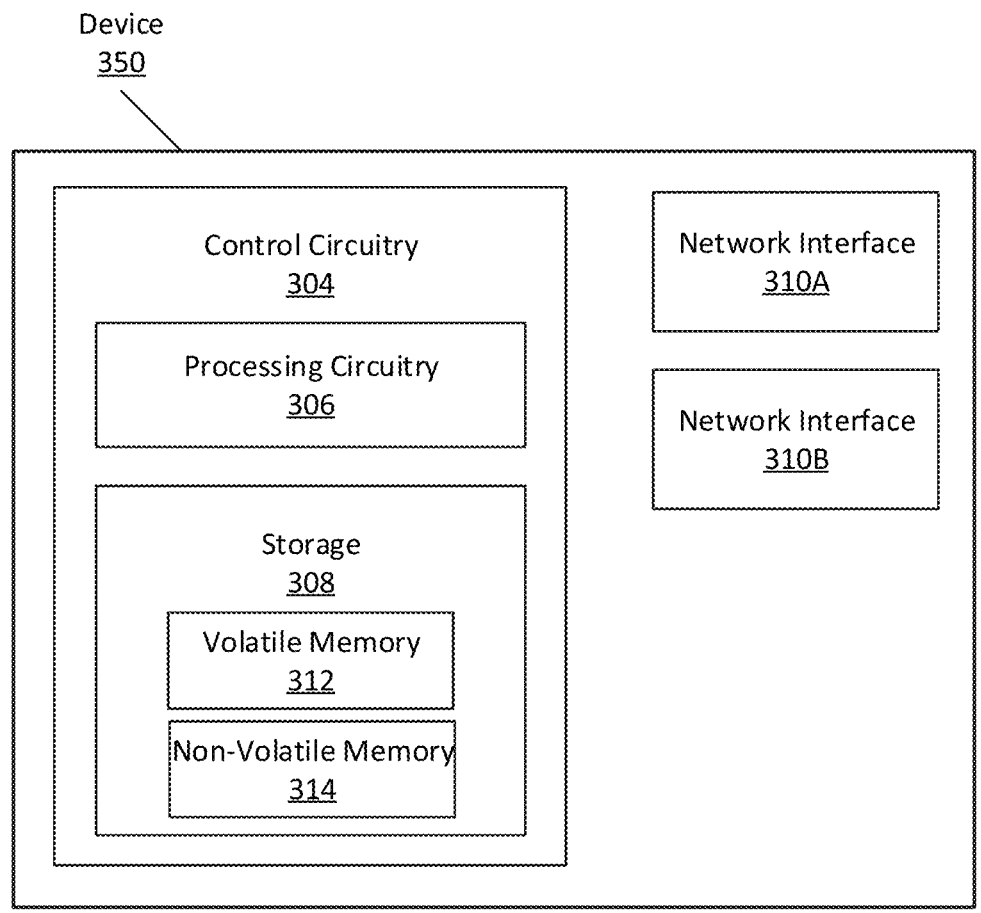
FIG. 3B shows a diagram of an illustrative host device of the system of FIG. 1, in accordance with some embodiments of the disclosure.

FIG. 3B shows a generalized embodiment of a device 350. As depicted, device 350 may be a host, such as a server and/or any other device on a network that can be configured to assume a VIP address of another device on the network when that other device goes offline. Those skilled in the art will recognize that primary host 115 and standby host 125 of FIG. 1 may be implemented as device 350. Similar to network device 300, device 350 includes control circuitry 304, which includes processing circuitry 306 and storage 308, and one or more network interfaces (depicted as network interfaces 310A and 310B). Storage 308 may include volatile memory 312 and non-volatile memory 314. The structure and/or function of these components, having been described above with reference to FIG. 3A, are not being described again for the purpose of brevity.

Figure 4A:
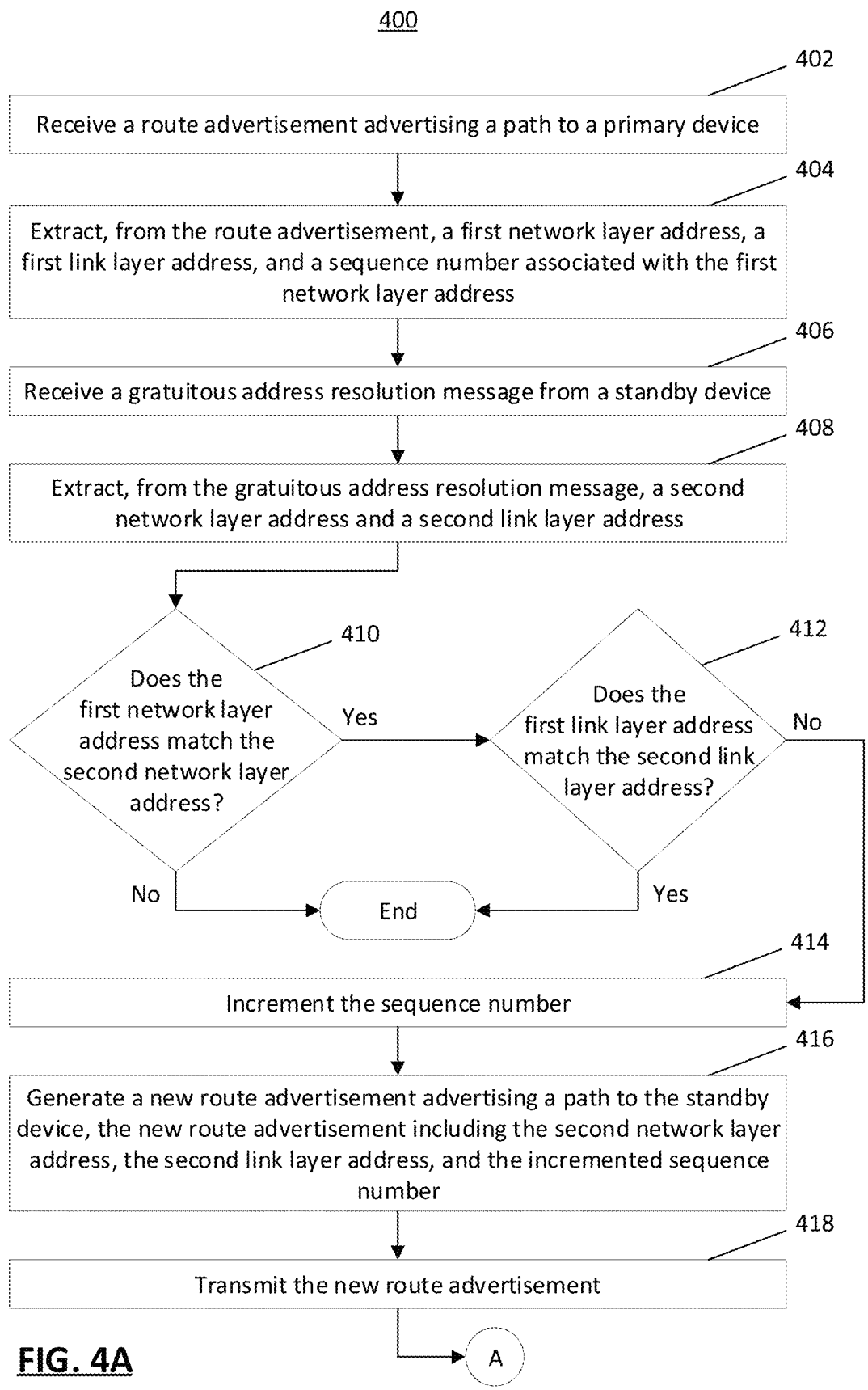
FIG. 4A shows a flowchart of an illustrative process for distributing a route advertisement including a sequence number associated with a network layer address, in accordance with some embodiments of the disclosure.
Figure 4B:
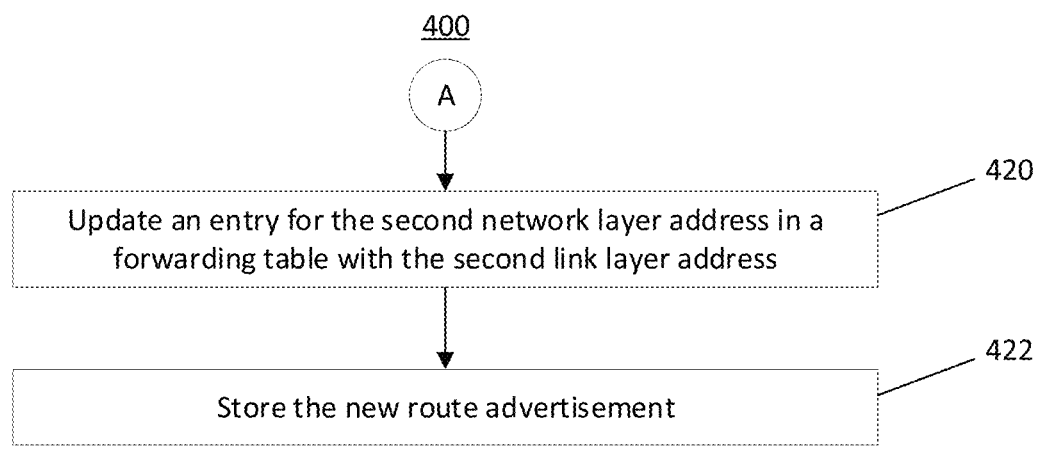
FIG. 4B shows additional aspects of the illustrative process of FIG. 4A, in accordance with some embodiments of the disclosure.

FIGS. 4A and B show a flowchart of an illustrative process 400 for distributing a route advertisement including a sequence number associated with a network layer address, in accordance with some embodiments of the disclosure. Process 400 may begin at block 402, where control circuitry, such as control circuitry 304 of network device 300 (FIG. 3A), receives a route advertisement (e.g., route advertisement 117) advertising a path to a primary device (e.g., primary host 115). Route advertisement 117 may originate at network device 110 and may be shared with all network devices on network 100 that maintain an EVPN session with network device 110.

At block 404, control circuitry 304 extracts, from the route advertisement received at block 402, a first network layer address, a first link layer address, and a sequence number associated with the first network layer address. For example, control circuitry 304 may extract an IP address (in this scenario, the VIP address shared between primary host 115 and standby host 125), a MAC address (in this scenario, the MAC address of primary host 115), and an IP sequence number associated with the VIP address.

At block 406, control circuitry 304 receives a gratuitous address resolution message from a standby device. For example, control circuitry 304 receives gratuitous address resolution message 123 from standby host 125. Standby host 125 may generate and transmit gratuitous address resolution message 123 when it is brought online and assumes the VIP address as its network layer address.

At block 408, control circuitry 304 extracts, from the gratuitous address resolution message received at block 406, a second network layer address and a second link layer address. For example, control circuitry 304 extracts, from gratuitous address resolution message 123, an IP address (in this scenario, the VIP address shared between primary host 115 and standby host 125), and a MAC address (in this scenario, the MAC address of standby host 125).

At block 410, control circuitry 304 determines whether the first network layer address (extracted at block 404) matches the second network layer address (extracted at block 408). For example, control circuitry 304 compares the network layer address of primary host 115 to the network layer address of standby host 125 to determine if the network layer addresses match. In response to determining that the first network layer address and the second network layer address do not match, process 400 ends. Alternatively, in response to determining that the first network layer address and the second network layer address match (as would be the case if primary host 115 and standby host 125 share a VIP address), process 400 proceeds to block 412.

At block 412, control circuitry 304 determines whether the first link layer address (extracted at block 404) matches the second link layer address (extracted at block 408). For example, control circuitry 304 compares the link layer address of primary host 115 to the link layer address of standby host 125 to determine if the link layer addresses match. In response to determining that the first link layer address and the second link layer address match, process 400 ends. Alternatively, in response to determining that the first link layer address and the second link layer address do not match, process 400 proceeds to block 414.

At block 414, control circuitry 304 increments the sequence number extracted at block 404. For example, control circuitry 304 increments the IP sequence number associated with the VIP address by a predetermined increment (e.g., by 1). Thus, if the IP sequence number extracted at block 404 was 0, control circuitry 304 will increment the IP sequence number to 1. Those skilled in the art will appreciate that the increment of 1 is merely illustrative and that any other increment value may be substituted for the example provided here without departing from the scope of the present disclosure.

At block 416, control circuitry 304 generates a new route advertisement advertising a path to the standby device from which the gratuitous address resolution message was received at block 406. For example, control circuitry 304 generates route advertisement 127 to advertise a path to standby host 125. Route advertisement 127 may include the second network layer address (extracted at block 408, which is the VIP address), the second link layer address (extracted at block 408, which is the MAC address of standby host 125), and the incremented IP sequence number as updated at block 414. The process for generating a route advertisement including an IP sequence number is further described below with reference to FIG.

At block 418, control circuitry 304 transmits the new route advertisement generated at block 416. For example, control circuitry 304 may transmit route advertisement 127 to network devices 110 and 130 with which network device 120 maintain an EVPN session.

At block 420, control circuitry 304 updates an entry, for the second network layer address, in a forwarding table with the second network layer address (extracted at block 408). For example, control circuitry 304 may update an entry for the VIP address in a forwarding table of network device 120 with the MAC address of standby host 125.

At block 422, control circuitry 304 stores the new route advertisement generated at block 416. For example, control circuitry 304 may store route advertisement 127 in storage 308.

Figure 5:
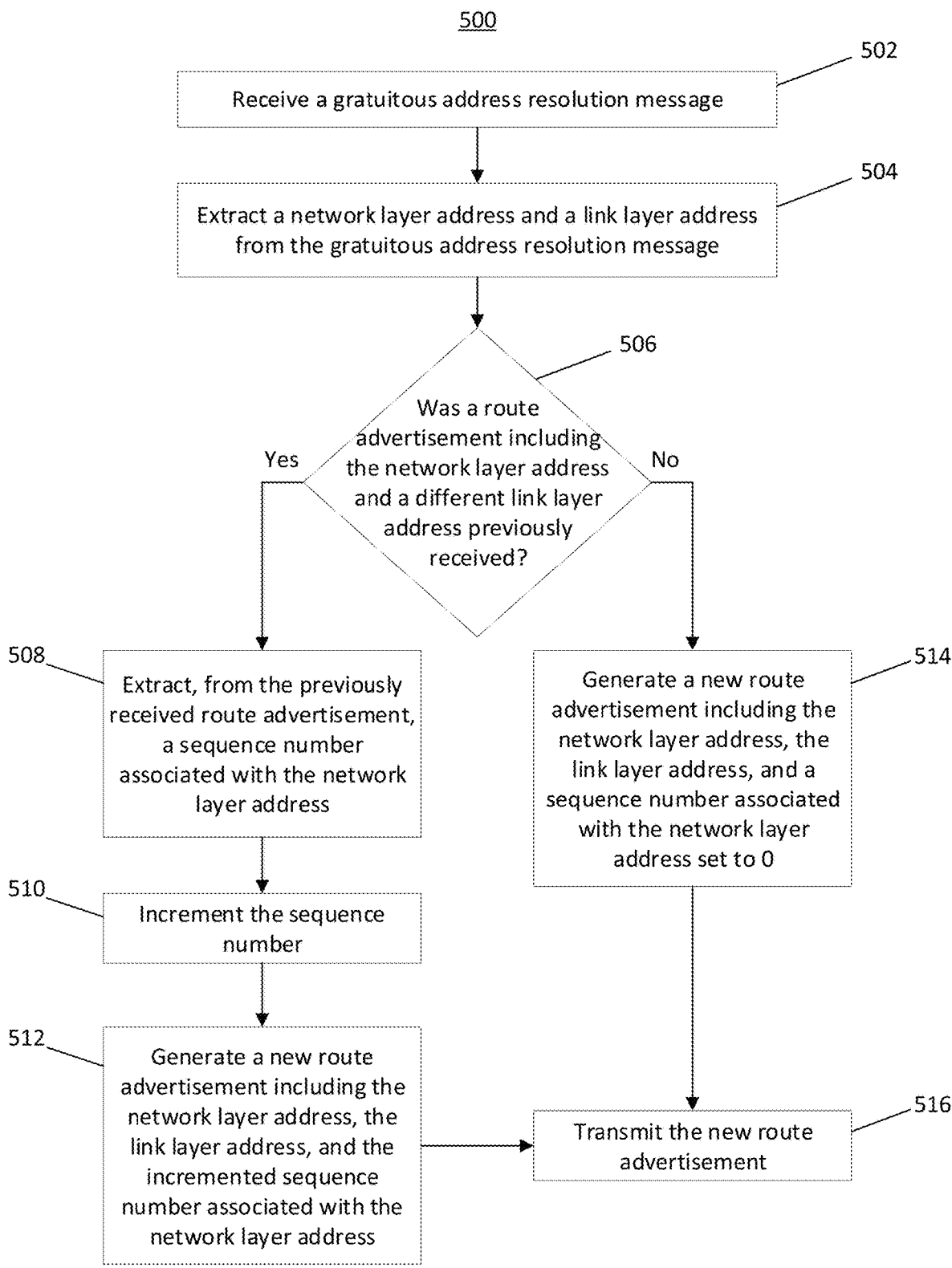
FIG. 5 is a flowchart of a detailed illustrative process for generating a route advertisement including a sequence number associated with a network layer address, in accordance with some embodiments of the disclosure.

FIG. 5 is a flowchart of a detailed illustrative process 500 for generating a route advertisement including a sequence number associated with a network layer address, in accordance with some embodiments of the disclosure. Process 500 may begin at block 502, where control circuitry, such as control circuitry 304 of network device 300 (FIG. 3A) receives a gratuitous address resolution message. For example, control circuitry 304 receives gratuitous address resolution message 123 from standby host 125.

At block 504, control circuitry 304 extracts, from the gratuitous address resolution message received at block 502, a network layer address and a link layer address. For example, control circuitry 304 extracts the IP address (which is the VIP address shared by primary host 115 and standby host 125) and the MAC address of standby host 125 from gratuitous address resolution message 123.

At block 506, control circuitry 304 determines whether a route advertisement including the network layer address (extracted at block 504) and a different link layer address (i.e., not the link layer address extracted at block 504) was previously received. For example, control circuitry 304 may search previously received route advertisements for a route advertisement that includes the VIP address, and if such a route advertisement is found, determine whether that route advertisement includes a different link layer address than the link layer address extracted at block 504. In response to determining that a route advertisement including the network layer address (extracted at block 504) and a different link layer address was previously received, process 500 proceeds to block 508. In response to determining that a route advertisement including the network layer address (extracted at block 504) and a different link layer address was not previously received, process 500 proceeds to block 514.

At block 508, control circuitry 304 extracts, from the previously received route advertisement (as identified at block 506) a sequence number associated with the network layer address. For example, control circuitry 304 extracts an IP sequence number associated with the VIP address from the route advertisement identified at block 506.

At block 510, control circuitry 304 increments the sequence number extracted at block 508. For example, control circuitry 304 increments the IP sequence number associated with the VIP address by a predetermined increment (e.g., by 1).

At block 512, control circuitry 304 generates a new route advertisement including the network layer address (extracted at block 504), the link layer address (extracted at block 504), and the incremented sequence number (as updated at block 510). For example, control circuitry 304 generates route advertisement 127 to advertise a path to standby host 125. Route advertisement 127 includes the network layer address of standby host 125 (which is the VIP address), the link layer address of standby host 125, and the incremented IP sequence associated with the VIP address.

At block 514, control circuitry 304 generates a new route advertisement including the network layer address (extracted at block 504), the link layer address (extracted at block 504), and a sequence number associated with the network layer address, the sequence number being set to an initiation value. For example, control circuitry 304 generates a route advertisement including the IP address and MAC address of the device that transmitted the gratuitous address resolution message received at block 502, and an IP sequence number associated with the IP address, the IP sequence number being set to 0.

At block 516, control circuitry 304 transmits the new route advertisement generated at blocks 512 or 514. For example, after generating the new route advertisement at either blocks 512 or 514, control circuitry 304 transmits the new route advertisement to the other network devices with which network device 300 maintains an EVPN session.

Figure 6:
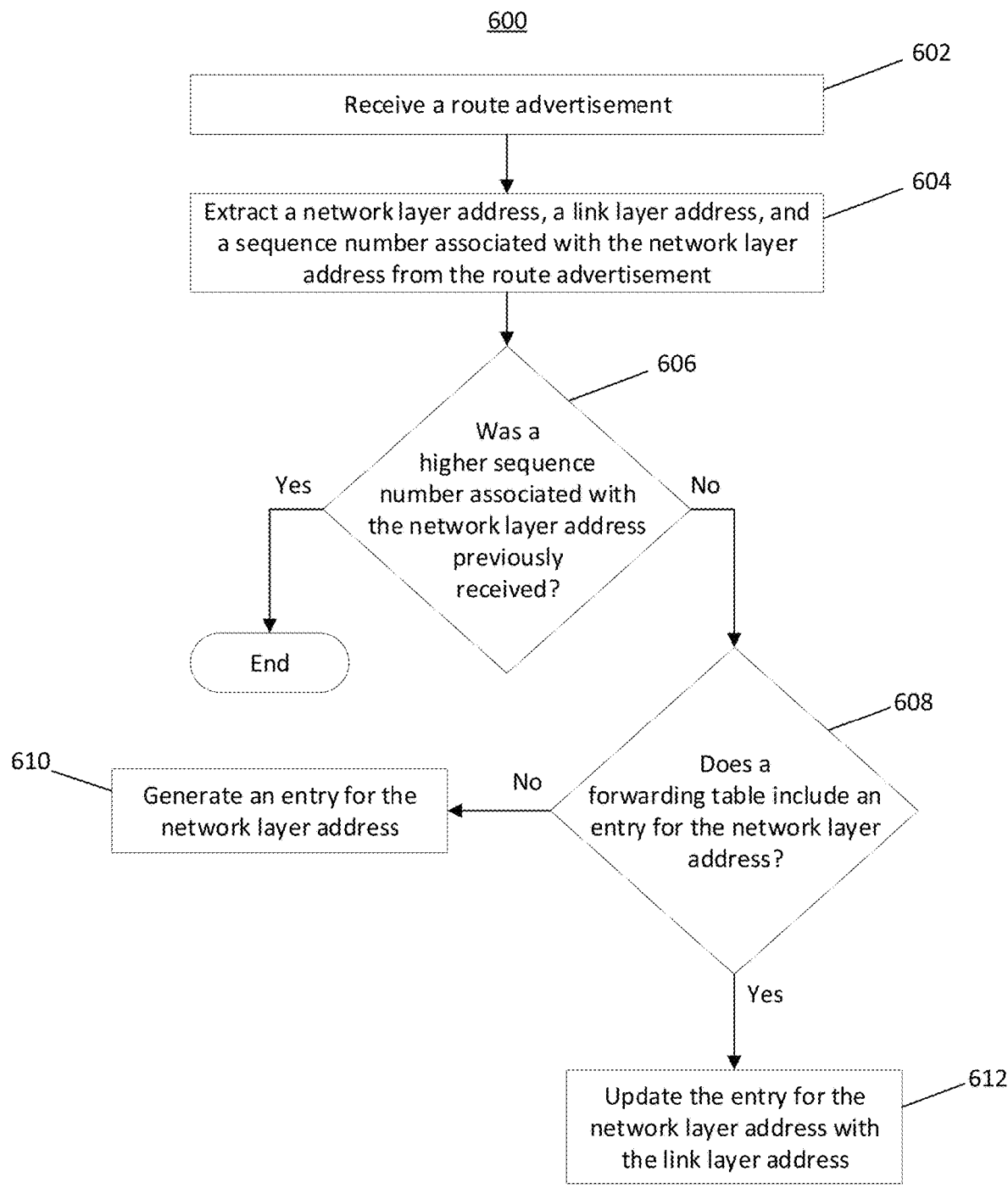
FIG. 6 shows a flowchart of an illustrative process for updating an address resolution table based on a route advertisement including a sequence number associated with a network layer address, in accordance with some embodiments of the disclosure.

FIG. 6 shows a flowchart of an illustrative process 600 for updating an address resolution table based on a route advertisement including a sequence number associated with a network layer address, in accordance with some embodiments of the disclosure. Process 600 begins at block 602, where control circuitry, such as control circuitry 304 of device 300 (FIG. 3A), receives a route advertisement. For example, control circuitry 304 may receive route advertisement 127 from network device 120 as transmitted at block 418 of FIG. 4A.

At block 604, control circuitry 304 extracts, from the route advertisement received at block 602, a network layer address, a link layer address, and a sequence number associated with the network layer address. For example, control circuitry 304 extracts, from route advertisement 127, an IP address (which is the VIP address shared by primary host 115 and standby host 125) and a MAC address of standby host 125, and the IP sequence number associated with the VIP address.

At block 606, control circuitry 304 determines whether a higher sequence number associated with the network layer address (extracted at block 604) was previously received. For example, control circuitry 304 determines whether a previously received route advertisement including the network layer address extracted at block 604 included an IP sequence number that is higher than the IP sequence number extracted at block 604. In response to determining that a higher sequence number associated with the network layer address (extracted at block 604) was previously received, process 600 ends. In response to determining that a higher sequence number associated with the network layer address (extracted at block 604) was not previously received, process 600 proceeds to block 608.

At block 610, control circuitry 304 determines whether a forwarding table includes an entry for the network layer address extracted at block 604. For example, control circuitry 304 determines whether forwarding table 135 includes an entry for the VIP address. In response to determining that the forwarding table does not include an entry for the network layer address extracted at block 604, process 600 proceeds to block 610. In response to determining that the forwarding table includes an entry for the network layer address extracted at block 604, process 600 proceeds to block 612.

At block 610, control circuitry 304 generates an entry for the network layer address extracted at block 604. For example, control circuitry 304 may generate an entry for the VIP address in forwarding table 135. The generated entry may include the VIP address and the link layer address extracted at block 604.

At block 612, control circuitry 304 updates the entry (identified at block 608) for the network layer address (extracted at block 604) with the link layer address extracted at block 604. For example, control circuitry 304 may update the entry for the VIP address in forwarding table 135 with the MAC address of standby host 125.

Figure 7:
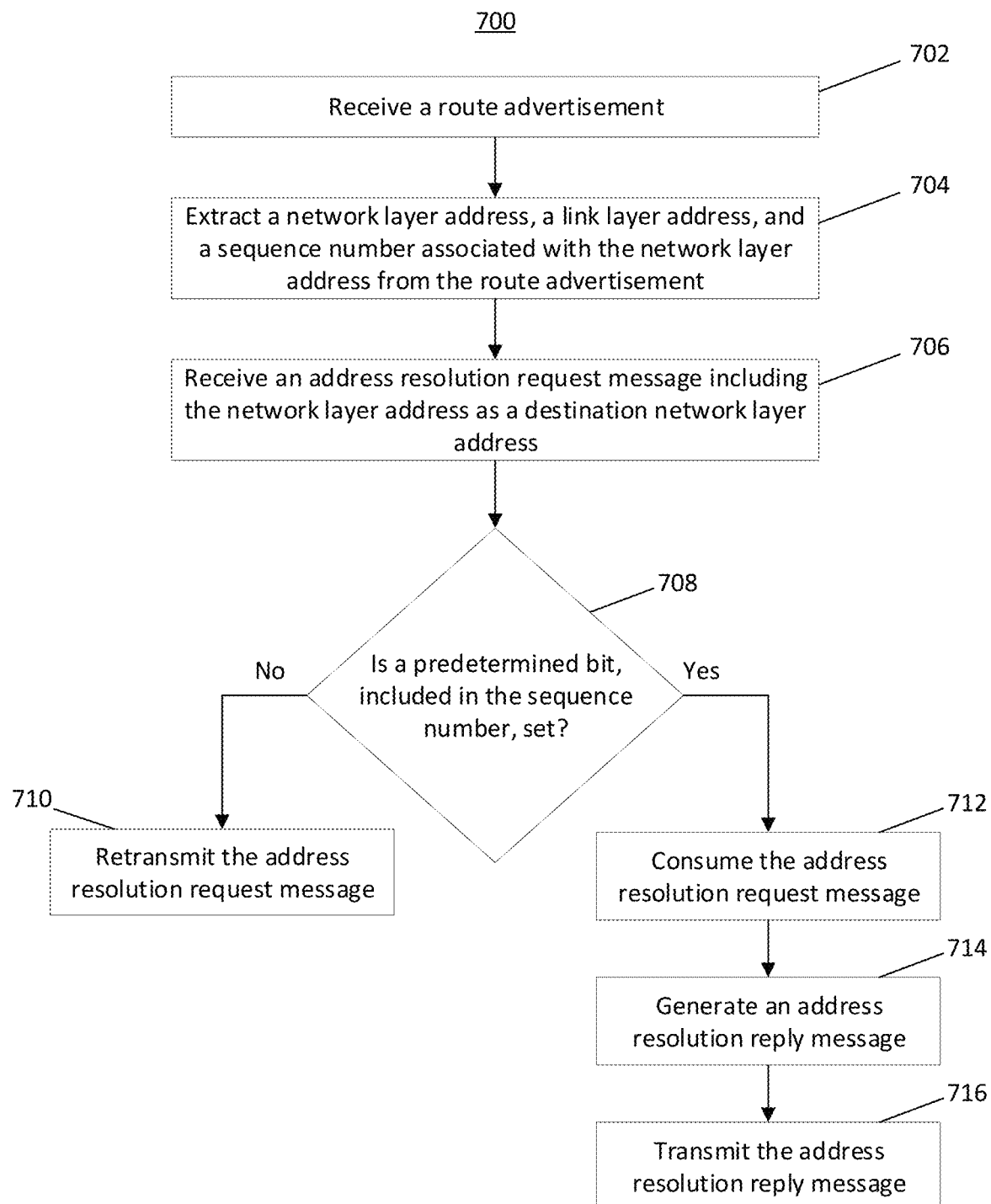
FIG. 7 shows a flowchart of an illustrative process for proxying address resolution request messages based on a sequence number associated with a network layer address, in accordance with some embodiments of the disclosure.

FIG. 7 is a flowchart of an illustrative process 700 for proxying address resolution request messages based on a sequence number associated with a network layer address, in accordance with some embodiments of the disclosure. Process 700 begins at 702, where control circuitry, such as control circuitry 304 of device 300 (FIG. 3A), receives a route advertisement. For example, control circuitry 304 may receive a route advertisement transmitted from another network device.

At block 704, control circuitry 304 extracts, from the route advertisement received at block 702, a network layer address, a link layer address, and a sequence number associated with the network layer address. For example, control circuitry 304 may extract an IP address, a MAC address, and an IP sequence number from the route advertisement.

At block 706, control circuitry 304 receives an address resolution request message including the network layer address (extracted at block 704) as a destination network layer address. For example, control circuitry 304 may receive an address resolution request message including the IP address extracted at block 704 as the destination IP address of the address resolution message.

At block 708, control circuitry 304 determines whether a predetermined bit included in the sequence number (extracted at block 704) is set. For example, control circuitry 304 may determine whether a proxy flag (e.g., a low-order bit of a flags octet) of the IP sequence number extracted at block 704 is set. The proxy flag indicates whether control circuitry 304 may act as an address resolution proxy for the IP address associated with that IP sequence number. In response to determining that the predetermined bit included in the sequence number is not set, process 700 proceeds to block 710. In response to determining that the predetermined bit included in the sequence number is set, process 700 proceeds to block 712.

At block 710, control circuitry 304 retransmits the address resolution request message received at block 706. For example, control circuitry 304 may relay the address resolution request message to each of the devices to which network device 300 is connected.

At block 712, control circuitry 304 consumes the address resolution request message received at block 706. For example, control circuitry 304 refrains from retransmitting the address resolution request message.

At block 714, control circuitry 304 generates an address resolution reply message. For example, control circuitry 304 may extract, from the address resolution request message (received at block 706) a source network layer address and/or source link layer address, and generate an address resolution reply message including, as the destination network layer address and/or destination link layer address, the source network layer address and/or source link layer address extracted from the address resolution request message. Control circuitry 304 may further include, as the source network layer address and source link layer address of the address resolution request message, the network layer address and link layer address extracted at block 704.

At block 716, control circuitry 304 transmits the address resolution reply message. For example, control circuitry 304 may transmit the address resolution reply message to a network device from which the address resolution request message was received at block 706.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for generating a route advertisement, the method comprising:
   receiving a first route advertisement advertising a path to a primary device, the first route advertisement including a network layer address, a first link layer address, and a first sequence number associated with the network layer address;
   receiving a gratuitous address resolution message from a standby device, the gratuitous address resolution message including the network layer address and a second link layer address;
   generating a second route advertisement advertising a path to the standby device, the second route advertisement including the network layer address, the second link layer address, and a second sequence number associated with the network layer address, wherein the second sequence number is incremented by a predetermined increment value over the first sequence number; and
   transmitting the second route advertisement.

2. The method of claim 1, further comprising updating an entry for the network layer address in an address resolution table with the second link layer address.

3. The method of claim 1, further comprising:
   retrieving the first route advertisement from storage; and
   extracting the first sequence number from the first route advertisement.

4. The method of claim 1, wherein the gratuitous address resolution message comprises a gratuitous address resolution protocol message or a gratuitous neighbor discovery protocol message.

5. The method of claim 1, further comprising storing the second route advertisement.

6. A method for generating a route advertisement, the method comprising:
   receiving a gratuitous address resolution message;
   extracting, from the gratuitous address resolution message, a network layer address and a first link layer address;
   determining whether a first route advertisement including the network layer address and a second link layer address was previously received;
   in response to determining that the first route advertisement was not previously received, generating a second route advertisement including the network layer address, the first link layer address, and a first sequence number associated with the network layer address, wherein the first sequence number is set to an initiation value; and
   transmitting the second route advertisement.

7. The method of claim 6, further comprising:
   in response to determining that the first route advertisement was previously received, retrieving a second sequence number associated with the network layer address included in the first route advertisement;
   generating a third route advertisement including the network layer address, the first link layer address, and a third sequence number associated with the network layer address, wherein the third sequence number is incremented by a predetermined increment value over the second sequence number; and
   transmitting the third route advertisement.

8. A method for updating an address resolution table, the method comprising:

receiving a first route advertisement including a network layer address, a link layer address, and a first sequence number associated with the network layer address;

determining whether a second sequence number associated with the network layer address, which was included in a previously received second route advertisement including the network layer address, is higher than the first sequence number; and in response to determining that the second sequence number is not higher than the first sequence number, updating an address resolution table entry for the network layer address with the link layer address.

9. The method of claim 8, further comprising:

in response to determining that the second sequence number is higher than the first sequence number, refraining from updating the address resolution table entry for the network layer address.

10. The method of claim 8, wherein updating the address resolution table entry for the network layer address comprises:

determining whether the address resolution table includes the entry for the network layer address; and in response to determining that the address resolution table includes the entry for the network layer address, updating the entry.

11. The method of claim 10, further comprising, in response to determining that the address resolution table does not include an entry for the network layer address, generating the entry for the network layer address, the entry including the network layer address and the link layer address.

12. A method for forwarding an address resolution request message, the method comprising:

receiving a route advertisement including a network layer address;

extracting, from the route advertisement, a sequence number associated with the network layer address;

receiving an address resolution request message including the network layer address as a destination network layer address;

determining whether a predetermined bit of the sequence number is set; and in response to determining that the predetermined bit of the sequence number is not set, retransmitting the address resolution request message.

13. The method of claim 12, further comprising:

in response to determining that the predetermined bit of the sequence number is set:

generating an address resolution reply message; and transmitting the address resolution reply message.

14. A system for generating a route advertisement, the system comprising:

a network interface configured to:

receive a first route advertisement advertising a path to a primary device, the first route advertisement including a network layer address, a first link layer address, and a first sequence number associated with the network layer address; and receive a gratuitous address resolution message from a standby device, the gratuitous address resolution message including the network layer address and a second link layer address; and control circuitry configured to:

generate a second route advertisement advertising a path to the standby device, the second route advertisement including the network layer address, the second link layer address, and a second sequence number associated with the network layer address, wherein the second sequence number is incremented by a predetermined increment value over the first sequence number; and transmit the second route advertisement.

15. The system of claim 14, wherein the control circuitry is further configured to update an entry for the network layer address in an address resolution table with the second link layer address.

16. The system of claim 14, wherein the control circuitry is further configured to:

retrieving the first route advertisement from storage; and extracting the first sequence number from the first route advertisement.

17. The system of claim 14, wherein the gratuitous address resolution message comprises a gratuitous address resolution protocol message or a gratuitous neighbor discovery protocol message.

18. The system of claim 14, wherein the control circuitry is further configured to store the second route advertisement.

19. A system for generating a route advertisement, the system comprising:

a network interface configured to receive a gratuitous address resolution message; and control circuitry configured to:

extract, from the gratuitous address resolution message, a network layer address and a first link layer address;

determine whether a first route advertisement including the network layer address and a second link layer address was previously received;

in response to determining that the first route advertisement was not previously received, generate a second route advertisement including the network layer address, the first link layer address, and a first sequence number associated with the network layer address, wherein the first sequence number is set to an initiation value; and transmit the second route advertisement.

20. The system of claim 19, wherein the control circuitry is further configured to:

in response to determining that the first route advertisement was previously received, retrieve a second sequence number associated with the network layer address included in the first route advertisement;

generate a third route advertisement including the network layer address, the first link layer address, and a third sequence number associated with the network layer address, wherein the third sequence number is incremented by a predetermined increment value over the second sequence number; and transmit the third route advertisement.

21. A system for updating an address resolution table, the system comprising:

a network interface configured to receive a first route advertisement including a network layer address, a link layer address, and a first sequence number associated with the network layer address; and control circuitry configured to:

determine whether a second sequence number associated with the network layer address, which was included in a previously received second route advertisement including the network layer address, is higher than the first sequence number; and in response to determining that the second sequence number is not higher than the first sequence number, update an address resolution table entry for the network layer address with the link layer address.

22. The system of claim 21, wherein the control circuitry is further configured to:
in response to determining that the second sequence number is higher than the first sequence number, refrain from updating the address resolution table entry for the network layer address.

23. The system of claim 21, wherein the control circuitry is configured to update the address resolution table entry for the network layer address by:
determining whether the address resolution table includes the entry for the network layer address; and
in response to determining that the address resolution table includes the entry for the network layer address, updating the entry.

24. The system of claim 23, wherein the control circuitry is further configured to, in response to determining that the address resolution table does not include an entry for the network layer address, generate the entry for the network layer address, the entry including the network layer address and the link layer address.

25. A system for forwarding an address resolution request message, the system comprising:
a network interface configured to receive a route advertisement including a network layer address; and
control circuitry configured to:
extract, from the route advertisement, a sequence number associated with the network layer address;
receive an address resolution request message including the network layer address as a destination network layer address;
determine whether a predetermined bit of the sequence number is set; and
in response to determining that the predetermined bit of the sequence number is not set, retransmit the address resolution request message.

26. The system of claim 25, wherein the control circuitry is further configured to:
in response to determining that the predetermined bit of the sequence number is set:
generate an address resolution reply message; and
transmit the address resolution reply message.

* * * * *